United States Patent
Ueno

[11] Patent Number: 5,978,097
[45] Date of Patent: Nov. 2, 1999

[54] FACSIMILE APPARATUS WITH DATA TRANSFER FUNCTION

[75] Inventor: Seizo Ueno, Hino, Japan

[73] Assignee: Kabushiki Kaisha Toshiba, Kawasaki, Japan

[21] Appl. No.: 08/950,978

[22] Filed: Oct. 15, 1997

Related U.S. Application Data

[63] Continuation of application No. 08/613,548, Mar. 11, 1996, abandoned, which is a continuation of application No. 08/318,515, Oct. 5, 1994, abandoned, which is a continuation of application No. 07/997,645, Dec. 28, 1992, abandoned, which is a continuation of application No. 07/509,738, Apr. 17, 1990, abandoned.

[30]     Foreign Application Priority Data

Apr. 19, 1989  [JP]  Japan ....................... 1-99207

[51] Int. Cl.⁶ ...................................... H04N 1/00
[52] U.S. Cl. .................... 358/407; 358/434; 358/440; 358/404
[58] Field of Search ..................... 358/407, 404, 358/440, 488, 434, 437, 439, 296

[56]         References Cited

U.S. PATENT DOCUMENTS

| | | | |
|---|---|---|---|
| 4,573,083 | 2/1986 | Shimizu | 358/407 |
| 4,704,636 | 11/1987 | Yano | 358/434 |
| 4,717,967 | 1/1988 | Yoshida | 358/296 |
| 4,741,021 | 4/1988 | Kotani et al. | 358/434 |
| 4,876,606 | 10/1989 | Banno et al. | 358/434 |
| 4,907,094 | 3/1990 | Mishima et al. | 358/404 |
| 4,994,926 | 2/1991 | Gordon et al. | 358/407 |
| 5,027,386 | 6/1991 | Hisano | 379/100 |

FOREIGN PATENT DOCUMENTS 2-65544  3/1990  Japan .................... 358/407

*Primary Examiner*—Thomas D. Lee
*Attorney, Agent, or Firm*—Finnegan, Henderson, Farabow, Garrett & Dunner, L.L.P.

[57]          ABSTRACT

A facsimile apparatus comprises an image scanner and a coder for image transmission, a decoder and a printer for image reception, and a modem and a network control unit for connection with a subscriber's line. These elements are connected to a control unit for controlling the entire apparatus. The presence/absence of printing paper is detected by a sensor. When the printing paper is absent, received image data is not supplied to the printer and instead is written in an image memory for performing a so-called substitute reception. The facsimile apparatus further comprises a dial number memory for storing a dial number of a predetermined facsimile apparatus, and a dialer for automatically dialing the dial number stored in the dial number memory. When the substitute reception is completed, the dial number stored in the dial number memory is dialed, and the image data stored in the image memory by the substitute reception is transferred to the predetermined facsimile apparatus and is printed.

26 Claims, 3 Drawing Sheets

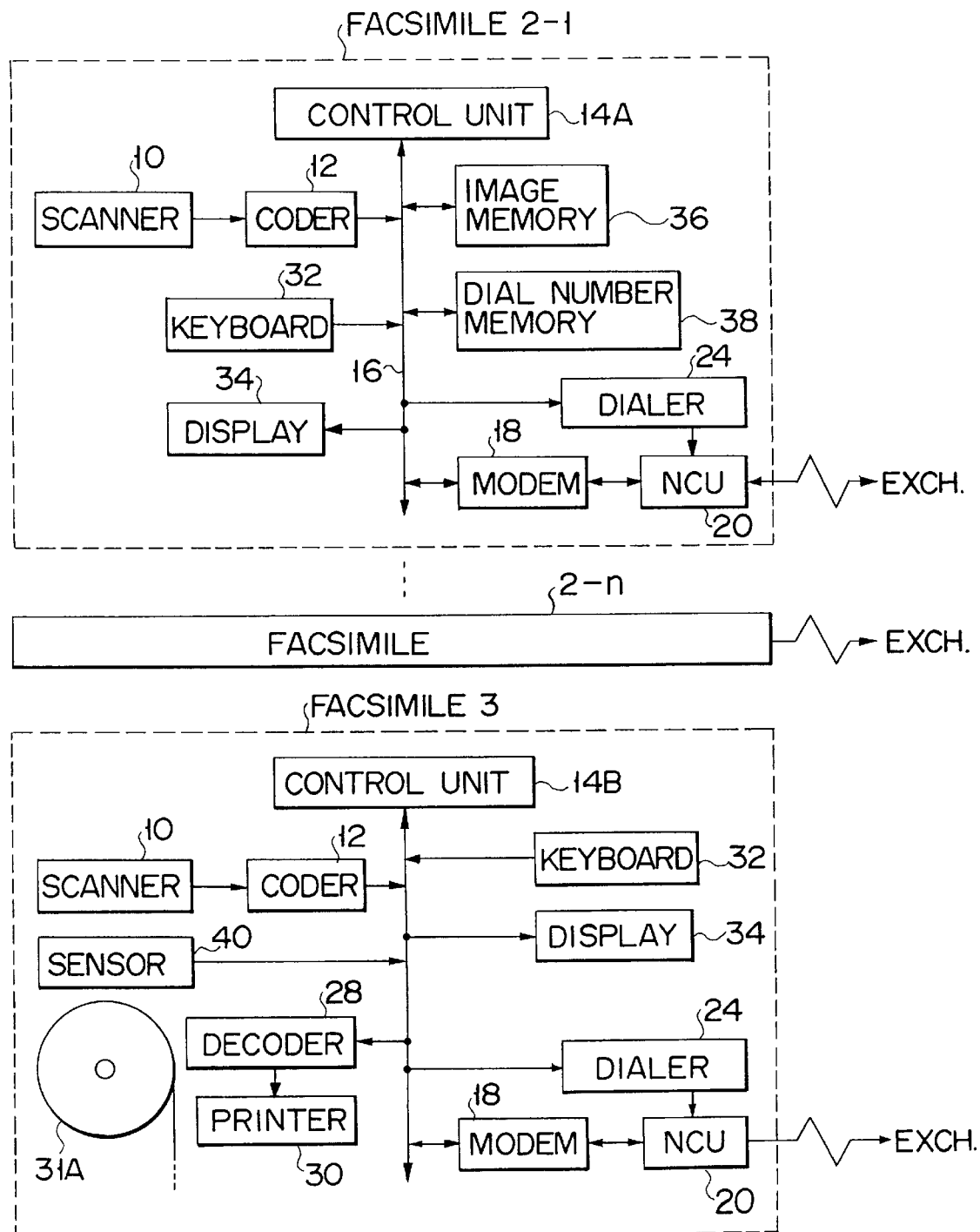
F I G. 3

FACSIMILE APPARATUS WITH DATA TRANSFER FUNCTION

This application is a continuation of application Ser. No. 08/613,548, filed Mar. 11, 1996, now abandoned, which is a continuation of application Ser. No. 08/318,515 filed Oct. 5, 1994, now abandoned, which is a continuation of application Ser. No. 07/997,645 filed Dec. 28, 1992, now abandoned, which is a continuation of Ser. No. 07/509,738 filed Apr. 17, 1990, now abandoned.

BACKGROUND OF THE INVENTION

1. Field of the Invention

The present invention relates generally to a facsimile apparatus, and more particularly to an operation of the apparatus required when a recording paper has run out.

2. Description of the Related Art

A facsimile apparatus generally has a roll of recording paper. When the apparatus detects the fact that the recording paper has nearly run out, the apparatus does not receive an image data even if the apparatus is called, and instead supplies a transmission error message to the transmission side and also supplies a demand to an exchanger to open the line. Thus, the transmission/reception of image data is disabled. In this case, there occurs no problem if an operator on the reception side immediately finds that the recording paper runs short and supplies a new one. If the recording paper is not supplied, however, the transmission/reception of image data is kept disabled.

Under the situation, in order to prevent the disabling of transmission/reception due to the running short of recording paper when the operator is not present at the receiver side or does not find the lack of recording paper, there has been proposed a facsimile apparatus having a memory for storing the transmitted image data when the recording paper has run out before the reception of image data or when the recording paper becomes run out during the reception of image data, instead of printing the data on the recording paper. This function is called a substitute reception. The stored image data is read out and printed on the recording paper, when the recording paper is supplied to the apparatus.

In this type of apparatus, however, if the memory is filled with image data with the recording paper being not supplied to the apparatus, the same problem, as mentioned above, will occur. In general, the memory has a small capacity corresponding only to the image data of several pages; therefore, if the operator is not present at the receiving side, the memory is soon filled with data and the transmission/reception is disabled. Though it is possible to increase the capacity of the memory, this will incur an increase in manufacturing cost of the facsimile apparatus.

SUMMARY OF THE INVENTION

An object of the present invention is to provide a facsimile apparatus having a simple structure, wherein disabling of data reception due to the absence of a recording medium is prevented.

The facsimile apparatus of the present invention comprises means for detecting the presence/absence of a recording medium, image storage means for for storing a received image data, number storage means for storing a subscriber's number of a predetermined facsimile apparatus, and means for transferring the image data stored in the image storage means to the predetermined facsimile apparatus based on the subscriber's number stored in the number storage means.

According to the facsimile apparatus of the present invention, when the recording medium has run out, the image data is temporarily stored in the image storage means to carry out a substitute reception. Then, the image data is automatically transferred to another facsimile apparatus and is printed on the recording medium set in the other facsimile apparatus. It is therefore unnecessary to keep the image data, received by the substitute reception, in the image storage means for a long time. Disabling of data reception due to the absence of the recording medium is thus prevented, even without increasing the capacity of the image storage means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a block diagram showing a facsimile apparatus according to a second embodiment of the present invention.

DETAILED DESCRIPTION OF THE PREFERRED EMBODIMENTS

Embodiments of the facsimile apparatus according to the present invention will now be described with reference to the accompanying drawings.

Figure 1:
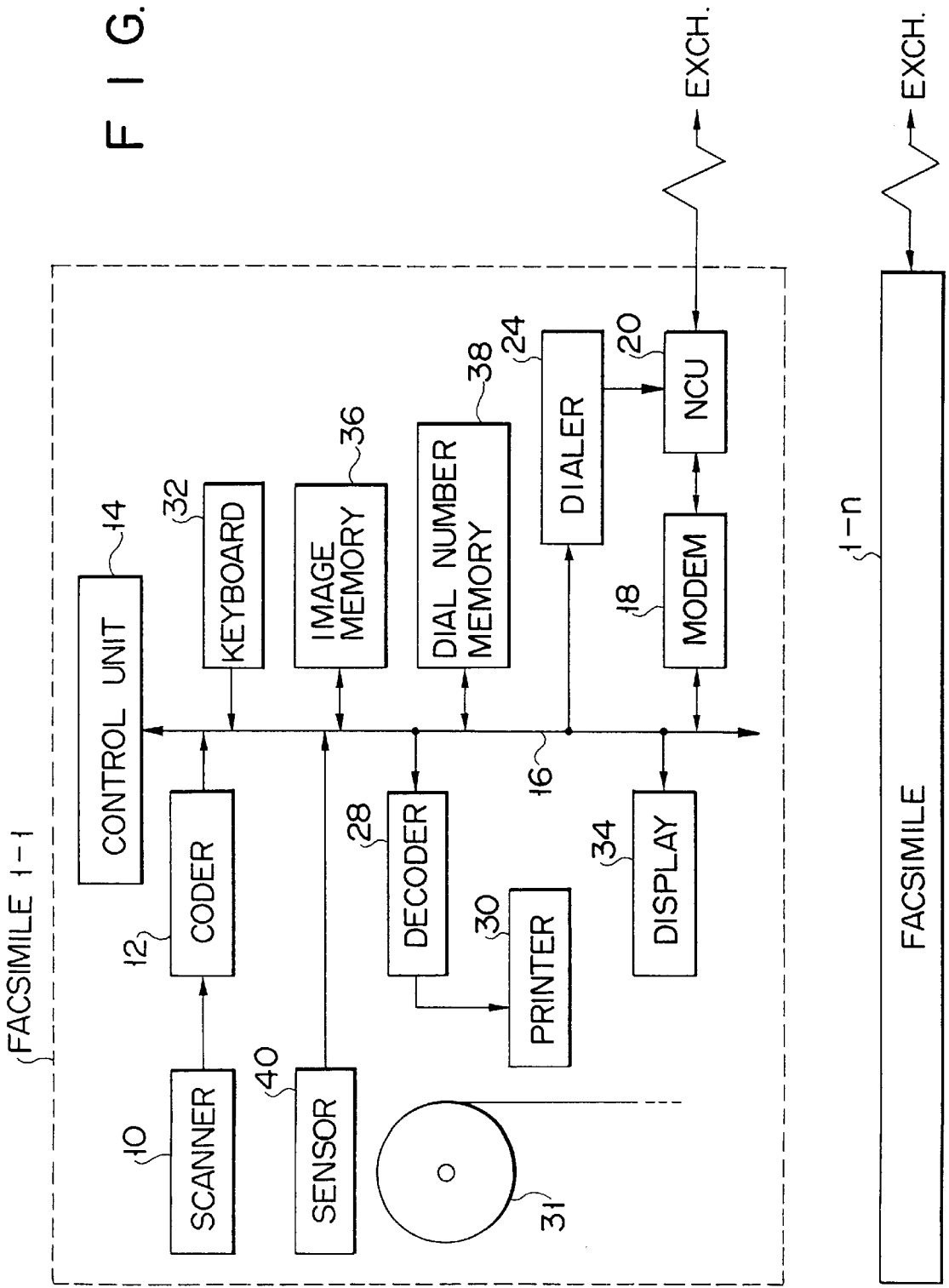
FIG. 1 is a block diagram showing a facsimile apparatus according to a first embodiment of the present invention.

FIG. 1 is a block diagram showing a first embodiment of the present invention. FIG. 1 shows a plurality of facsimile apparatuses 1-1, . . . , 1-n to which different subscriber's numbers are assigned. It is assumed that these facsimile apparatuses 1-1 to 1-n are managed by the same subscriber and are located at the different sections in the same office. Since each apparatus has the same structure, only the apparatus 1-1 will be described in detail.

An image scanner 10 reads image data of an original (not shown) to be transmitted set in the apparatus. The scanner 10 supplies an image signal corresponding to the read data to a coder 12. The coder 12 codes the input image signal and produces image data. The image data is fed to a modem (modulator/demodulator) 18 through a bus line 16 of a control unit 14. The image data is modulated by the modem 18 and is output through a network control unit (NCU) 20 to a subscriber's line and an exchanger (not shown). If the apparatuses 1-1 to 1-n are connected to extension lines, they are connected to a private branch exchanger. The control unit 14 comprises a microcomputer and has functions such as reading, recording, transmission/reception, substitute reception, and transfer (described later). A dialer 24 for generating a dial pulse corresponding to a dial number of a destination is connected to the network control unit 20. The dialer 24 is connected to the control unit 14 through the bus line 16. Though not shown, a telephone (for dialing) may be connected to the NCU 20.

On the other hand, the image data transmitted to the facsimile apparatus through the communication line is input to the modem 18 through the NCU 20. The image data is demodulated in the modem 18 and is input to a decoder 28 through the bus line 16. The decoder 28 decodes the input image data and reproduces the image signal. The reproduced image signal is fed to a printer 30 and is recorded on a recording paper 31 as an image. When the recording paper 31 is a roll-type, the paper 31, after recording, is cut by a cutter, and resultant paper sheets are stacked in a stacker (not shown). A sensor 40 for detecting the presence/absence of the recording paper 31 is arranged near the recording paper 31. When a roll-type recording paper 31 is used, the sensor 40 detects the diameter of the roll, and detects the absence of paper when the diameter decreases to a predetermined value or less. In this case, the sensor 40 outputs a detection signal to the bus line 16 of the control unit 14. If the recording paper 31 is of the cassette type, the sensor 40 determines whether the cassette is empty or not.

The bus line 16 of the control unit 14 is further connected to a keyboard 32, a display 34, an image memory 36, and a dial number memory 38. The keyboard 32 and the display 34 are arranged on a console panel (not shown). In order to carry out a so-called substitute reception when the absence of recording paper 31 is detected, demodulated image signals are stored in the image memory 36. The dial number memory 38 stores a dial number of another facsimile apparatus, to which the substitute-received image signals stored in the image memory 36 are to be transferred. Thus, the keyboard 32 has many key switches, and includes an operation member for inputting a dial number for normal dialing and registering a dial number in the dial number memory 38. This operation member may be a key switch with number keys, a push-button type switch, or a dial. Here, the destination for transfer of data is probably a facsimile apparatus having a subscriber's number, which is managed by the same subscriber. When a plurality of facsimile apparatuses are provided as destinations, a specific one of the destinations may be determined in advance, or the facsimile apparatuses have the priorities and the destination may be determined according to priorities.

Figure 2:
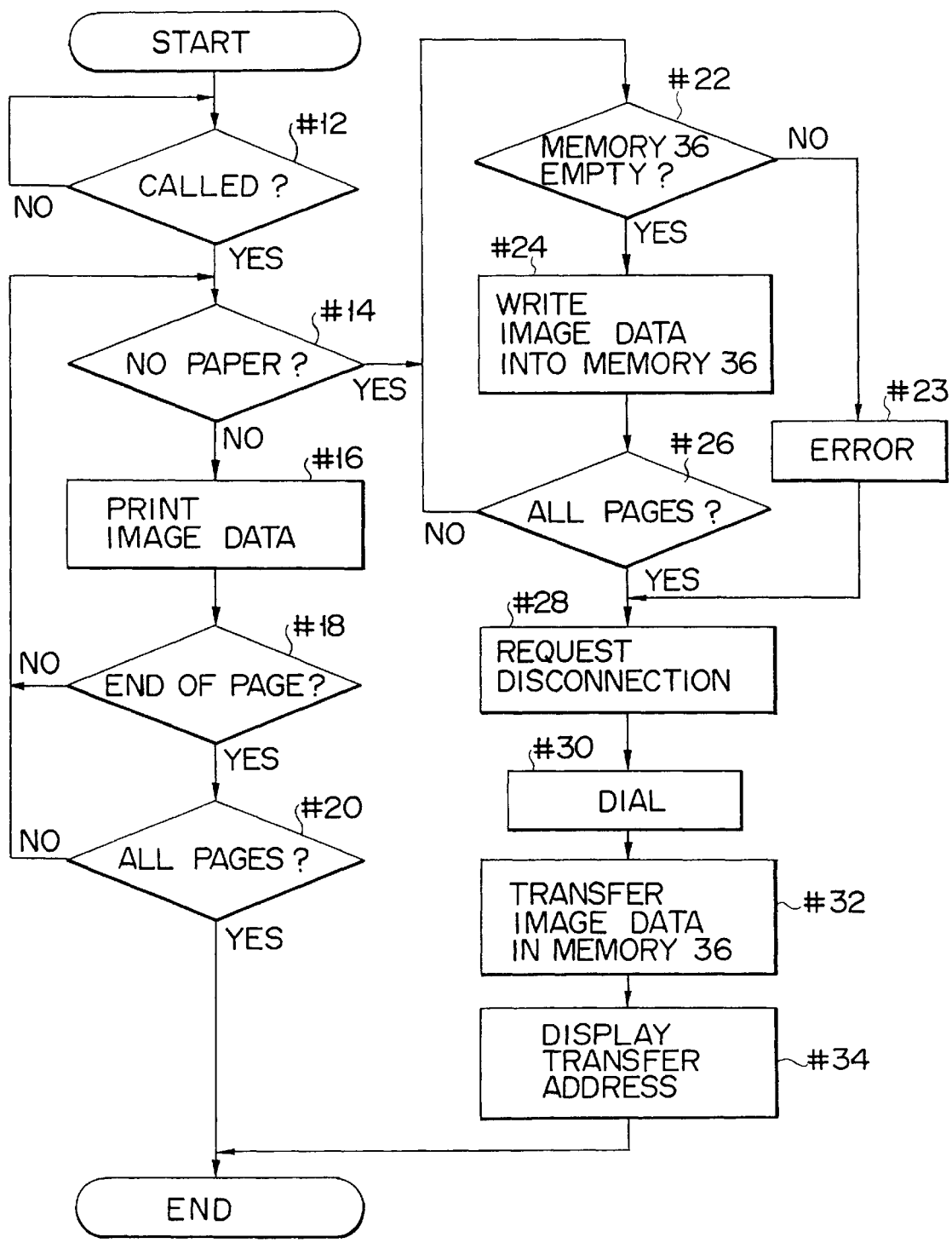
FIG. 2 is a flowchart for illustrating the operation of the first embodiment.

The data receiving operation of the facsimile apparatus 1-1 will now be described with reference to the flowchart of FIG. 2 showing the control routine of the control unit 14. In step #12, it is determined whether or not the apparatus is called. If YES in step #12, it is determined in step #14 whether or not the recording paper 31 has run out, on the basis of an output from the sensor 40. If NO in step #14, the control routine advances to step #16 in which the image data is received, demodulated in the modem 18, and decoded in the decoder 28, and then the reproduced image signal is supplied to the printer 30 and the image is printed on the recording paper 31. In step #18, it is determined whether or not recording of one page has been completed. If the recording of one page has not been completed, the control returns to step #14. If YES in step #18, it is determined in step #20 whether or not recording of all pages has been completed. If NO in step #20, the control routine returns to step #14. If YES in step #20, the receiving operation is ended.

If the absence of the recording paper 31 is detected in step #14, it is determined in step #22 whether or not an empty area of the image memory 36 is greater than a predetermined value. If the image memory 36 has a sufficient empty area, the image data is received in step #24, and the substitute reception is carried out. In the substitute reception, the image data demodulated by the modem 18 is written in the image memory 36, instead of the operation of supplying the demodulated data to the decoder 28 for recording. In step #26, it is determined whether or not the image data of all pages has been written in the image memory 36. If NO in step #26, the empty area of the memory 36 is checked once again in step #22. If YES in step #26, a request for disconnection of the line is sent to the exchanger, and the line is opened. If it is determined in step #22 that the memory 36 has no sufficient empty area, a transmission error message is sent to the transmission side in step #23. In this case, the substitute reception is not carried out, and the line is immediately opened in step #28. In other words, in the case where the recording paper 31 has run out, the substitute reception is performed with use of the image memory 36; however, if the image memory 36 is filled with data during the substitute reception, the substitute reception is stopped and the transmission error message is sent to the transmitter side.

Once the line is opened, a dialing operation is carried out in step #30. A predetermined dial number is read out from the dial number memory 38, and the dialer 24 generates a dial pulse in accordance with the readout dial number. When the apparatus is connected to a destination facsimile apparatus, the image data stored in the image memory 36 is transferred to the destination apparatus in step #32. Thus, the image data stored by the substitute reception is automatically transferred to the destination facsimile apparatus having the dial number stored in the dial number memory 38. After the transfer of the data, the display 34 displays data denoting the transfer destination. Thus, the operation of the facsimile apparatus 1-1 is completed.

According to the first embodiment, if the apparatus is called, the presence/absence of the recording paper is first detected. If there is the recording paper, the image data is received and the received data is recorded on the recording paper. If there is no recording paper, the substitute reception is performed and the image data is written in the memory. After the substitute reception, the apparatus calls a predetermined destination facsimile apparatus based on the dial number read out from the dial number memory. Then, the image data stored in the memory is automatically transferred to the destination apparatus and is recorded on the recording paper in the destination apparatus. Therefore, even if the capacity of the image memory for the substitute reception is not increased, disabling of data reception due to the absence of recording paper is prevented. Since the data transfer is performed after the line is once opened, it is not necessary to change the control system of the exchanger. In the prior art, when a plurality of facsimile apparatuses are used by one subscriber and one of them is assigned with a key number, the recording paper is likely to run out in the apparatus having the key number, and the reception of only apparatus having the key number may be disabled. According to the first embodiment of the invention, when the recording paper has run out in the facsimile apparatus having the key number, the image data is transferred to another facsimile apparatus. Therefore, the recording paper in the other facsimile apparatus can be used effectively and disabling of data reception of the apparatus having the key number is prevented.

FIG. 3 is a block diagram showing a second embodiment of the invention. The second embodiment comprises a first type of facsimile apparatuses 2-1 to 2-n and a second type of facsimile apparatus 3. The facsimile apparatuses 2-1 to 2-n of the first type do not have the decoder 28, printer 30, recording paper 31 and sensor 40, which are provided in the facsimile apparatuses 1-1 to 1-n of the first embodiment. The facsimile apparatus 3 of the second type does not have the image memory 36 and the dial number memory 38 associated with the substitute reception and transfer operation, which are provided in the facsimile apparatuses 1-1 to 1-n of the first embodiment. In addition, in the facsimile apparatus 3, a roll-type recording paper 31A, which is greater in size (i.e. diameter) than the recording paper 31 used in the facsimile apparatuses 1-1 to 1-n, can be mounted. Namely, the first type of facsimile apparatuses 2-1 to 2-n are used exclusively for substitute reception, and recording functions thereof are omitted, resulting in reduction in size and manufacturing cost. All image data received by the facsimile apparatuses 2-1 to 2-n are printed by the facsimile apparatus 3; therefore, the operator may monitor the presence/absence of the recording paper only in the facsimile apparatus 3, and needs not to monitor the presence/absence of the recording paper in the facsimile apparatuses 2-1 to 2-n.

The present invention is not limited to the above embodiments, and various modification may be made within the scope of the subject matter of the invention. For example, though transfer destination data is only displayed in the first embodiment, this data may be recorded on recording paper when the paper is supplied to the apparatus in order to inform the operator of the destination facsimile. In the substitute reception, the image data may be transferred simultaneously to a plurality of apparatuses. In the embodiments, the transfer of data is performed each time the substitute reception is completed. However, it is possible to omit the transfer of each time of substitute reception and to transfer the stored image data when it is detected that the amount of an empty area of the image memory is smaller than a predetermined value. The destination facsimile apparatus does not necessarily have the substitute reception function or the transfer function. It is possible that only a facsimile apparatus with a key number may have the substitute reception function and the transfer function, and other facsimile apparatuses managed by the same subscriber may not have them. In the second embodiment, two or more of facsimile apparatuses of the second type, which have recording paper and correspond to the facsimile apparatus 3, may be provided. In this case, the second type of apparatuses need to have the substitute reception function and the transfer function. The substitute reception data may be transferred through an exclusive transfer line, and not through a communication line such as the subscriber's line. In this case, the dial number memory is needless. When the exclusive transfer line is used, image data may be transferred not to the facsimile apparatus but to a printing unit such as a laser beam printer having an image data reception function and a recording function for printing the received image data.

As has been described above, the present invention provides a facsimile apparatus having an image memory and being able to perform a substitute reception of writing received image data in the image memory when the recording paper has run out. In this apparatus, there are provided a dial number memory and a dialer, and the image data written in the image memory in the substitute reception is automatically transferred to another destination facsimile apparatus after the substitute reception. The image data is printed on a recording paper in the transfer destination facsimile apparatus. By virtue of these features, the structure of the apparatus is simplified, and the disabling of data reception due to the absence of the recording paper is prevented.

Additional advantages and modifications will readily occur to those skilled in the art. Therefore, the invention in its broader aspects is not limited to the specific details, representative apparatuses, and illustrated embodiments shown and described herein. Accordingly, various modifications may be made without departing from the spirit or scope of the general inventive concept as defined by the appended claims and their equivalents.

What is claimed is:

1. A facsimile network comprising:
 a plurality of first facsimile apparatuses with an automatic dialing function and a storing function and without a recording function, for receiving image data externally applied to the plurality of first facsimile apparatuses from an exchanger; and
 a plurality of second facsimile apparatuses with the recording function and without the automatic dialing function and the storing function, the plurality of second facsimile apparatuses being connected to the plurality of first facsimile apparatuses through the exchanger, wherein
 each of said plurality of first facsimile apparatuses includes storage means for storing received image data, dial number storing means for storing at least one dial number of said plurality of second facsimile apparatuses, dialing means for dialing one of said plurality of second facsimile apparatuses in accordance with the dial number stored in said dial number storing means to one of said plurality of second facsimile apparatuses after the storing of said image data in said storage means is complete, and display means for displaying the dial number of one of said plurality of second facsimile apparatuses to which the image data is transferred.

2. The facsimile network according to claim 1, wherein each of said first and second facsimile apparatuses is connected to a different subscriber's line.

3. The facsimile network according to claim 1, wherein said first facsimile apparatuses comprise a plurality of facsimiles connected to different subscriber's lines, and said second facsimile apparatuses comprises one or more facsimiles, the number of which is smaller than the number of the facsimiles of the first facsimile apparatuses.

4. The facsimile network according to claim 1, wherein said plurality of first facsimile apparatuses are each connected to a different subscriber line.

5. The facsimile network according to claim 1, wherein said dialing means comprises means for detecting an amount of an empty area of said storage means, and means for initiating the dialing of one of the plurality of second facsimile apparatuses when it is determined that the amount of the empty area of the storage means is smaller than a predetermined value.

6. The facsimile network according to claim 1, wherein said dialing means comprises means for storing dialing numbers of the plurality of second facsimile apparatuses with predetermined priorities, and means for sequentially dialing the ones of the plurality of second facsimile apparatuses with dialing numbers according to the predetermined priorities.

7. The facsimile network according to claim 1, wherein said transfer of image data comprises means for displaying data representative of the plurality of second facsimile apparatuses at the time of transfer, means for storing the data representative of the second facsimile apparatus, and means for displaying the data representative of the predetermined second facsimile apparatus.

8. The facsimile network according to claim 1, wherein each of said plurality of first facsimile apparatuses further comprises:

means for determining whether or not an amount of an empty area of the storage means is smaller than a predetermined value; and means for disabling reception of image data when the apparatus is called and it is determined that the amount of the empty area of the storage means is smaller than the predetermined value.

9. The facsimile network according to claim 1, in which said dial number storing means stores dial numbers of plural second facsimile apparatuses, the plural second facsimile apparatuses having operator-selected priorities, and said dialing means dials one of said plural second facsimile apparatuses in accordance with the operator-selected priorities of said plural second facsimile apparatuses.

10. A method for controlling a first facsimile apparatus having storage means for storing image data received through an exchanger and being able to perform a substitute reception and having a dial number memory for storing a dial number of a second facsimile apparatus, comprising the steps of:

detecting a presence/absence of a recording medium for recording the received image data, when the first facsimile apparatus is called;

recording the received image data in the recording medium when it is detected that the recording medium is present and detecting an amount of an empty area of the storage means when it is detected that the recording medium is absent;

temporarily storing the received image data in the storage means when it is detected that the amount of the empty area of the storage means is greater than a predetermined value, and disabling reception of the image data when it is detected that the amount of the empty area of the storage means is not greater that the predetermined value;

dialing the dial number stored in said dial number memory to transfer the image data, which has been temporarily stored in the storage means, to the second facsimile apparatus through an exchanger; and displaying the dial number of the second facsimile apparatus to which the image data is transferred.

11. The method according to claim 10, wherein said step of dialing a facsimile apparatus includes the substeps of dialing a first one of a plurality of stored dial numbers when it is detected that the amount of the empty area of the storage means is not greater than the predetermined value, and dialing a second one of said plurality of stored dial numbers if said first one of said dial numbers is busy.

12. The method according to claim 10, wherein the step of dialing the second facsimile apparatus includes the substeps of detecting an amount of an empty area of said storage means, and initiates the dialing to the second facsimile apparatus when it is determined that the amount of the empty area of the storage means is smaller than a predetermined value.

13. The method according to claim 10, wherein the step of dialing the second facsimile apparatus includes the substeps of detecting completion of storage of the received image data in said storage means, and initiates the dialing to the second facsimile apparatus when it is determined that storage of the received image data in the storage means has been completed.

14. The method according to claim 10, wherein the step of dialing the second facsimile apparatus includes the substeps of storing dialing numbers of a plurality of facsimile apparatuses with predetermined priorities, and sequentially dialing with the facsimile apparatuses with dialing numbers according to the predetermined priorities.

15. The method according to claim 10, further comprising the steps of:

displaying data representative of the second facsimile apparatus at the time of transfer;

storing the data representative of the second facsimile apparatus; and printing the data representative when the second facsimile apparatus on the recording medium when a change from absence to presence of a recording medium is detected.

16. The method according to claim 10, further comprising the steps of:

detecting a presence/absence of a recording medium each time image data of one page is received;

disabling writing of the received image data in the storage means and recording the received image data on the recording medium, when the presence of a recording medium is detected; and disabling printing of the received image data onto the recording medium, when the absence of a recording medium is detected.

17. The method according to claim 10, further comprising the steps of:

determining whether an amount of an empty area of the storage means is smaller than a predetermined value; and disabling reception of image data when the apparatus is called and it is determined that a recording medium is absent and the amount of the empty area of the storage means is smaller than the predetermined value.

18. The method according to claim 10, in which said dial number memory stores dial numbers of plural facsimile apparatuses, the plural facsimile apparatuses having priorities, and said dialing step dials one of said plural facsimile apparatuses in accordance with the priorities of said plural facsimile apparatuses.

19. A facsimile apparatus for recording image data, which is received from an exchanger, onto a recording medium, the apparatus comprising:

detection means for detecting a presence/absence of the recording medium;

storage means for temporarily storing the received image data when the absence of the recording medium is detected;

means for storing a dial number of a preselected facsimile apparatus;

means for dialing said preselected facsimile apparatus in accordance with the dial number stored in said dial number storing means to transfer the image data stored in said storage means to said preselected facsimile apparatus through the exchanger; and means for displaying the dial number of said preselected facsimile apparatus to which the image data is transferred.

20. The facsimile apparatus according to claim 19, wherein said dialing means comprises means for detecting an amount of an empty area of said storage means and means for starting a dialing to the preselected facsimile apparatus when it is determined that the amount of the empty area of the storage means is smaller than a predetermined value.

21. The facsimile apparatus according to claim 19, wherein said storage means comprises means for detecting a completion of storage of the received image data in said storage means, and wherein said dialing means comprises means for starting a dialing to the preselected facsimile apparatus when it is determined that the storage of the received image data in the storage means has been completed.

22. The facsimile apparatus according to claim 19, wherein said transfer means comprises means for storing dial numbers of a plurality of selectable facsimile apparatuses with predetermined priorities, and means for sequentially dialing the selectable facsimile apparatuses with dial numbers according to the predetermined priorities.

23. The facsimile apparatus according to claim 19, wherein said transfer means comprises means for displaying data representative of the preselected facsimile apparatus at the time of transfer, means for storing the data representative of the preselected facsimile apparatus, and means for printing the data representative of the preselected facsimile apparatus on the recording medium when a change from the absence to the presence of the recording medium is detected.

24. The facsimile apparatus according to claim 19, further comprising:

means for detecting the presence/absence of the recording medium each time image data of one page is received;

means for disabling writing of the received image data in the storage means and for recording the received image data onto the recording medium, when the presence of the recording medium is detected; and means for disabling printing of the received image data onto the recording medium, when the absence of the recording medium is detected.

25. The facsimile apparatus according to claim 19, further comprising:

means for determining whether or not an amount of an empty area of the storage means is smaller than a predetermined value; and means for disabling reception of the image data when the apparatus is called and it is determined that the recording medium is absent and the amount of the empty area of the storage means is smaller than the predetermined value.

26. The facsimile apparatus according to claim 19, in which said dial number storing means stores dial numbers of plural other facsimile apparatuses including said facsimile apparatus, the plural other facsimile apparatuses having priorities and changeable by an operator, and said dialing means dials one of said plural other facsimile apparatuses in accordance with the priorities of said plural other facsimile apparatuses.

\* \* \* \* \*